(12) United States Patent
Yamanaka et al.

(10) Patent No.: US 7,198,481 B2
(45) Date of Patent: Apr. 3, 2007

(54) INJECTION UNIT OF INJECTION MOLDING MACHINE

(75) Inventors: Katsuyuki Yamanaka, Yamanashi (JP); Koichi Nishimura, Susono (JP); Koji Shima, Fujiyoshida (JP)

(73) Assignee: Fanuc Ltd, Yamanashi (JP)

( * ) Notice: Subject to any disclaimer, the term of this patent is extended or adjusted under 35 U.S.C. 154(b) by 16 days.

(21) Appl. No.: 11/100,549

(22) Filed: Apr. 7, 2005

(65) Prior Publication Data

US 2005/0233027 A1 Oct. 20, 2005

(30) Foreign Application Priority Data

Apr. 14, 2004 (JP) .............................. 2004-118810

(51) Int. Cl.
*B29C 45/00* (2006.01)

(52) U.S. Cl. ...................... 425/574; 425/575; 425/587; 425/550

(58) Field of Classification Search ................ 425/550, 425/574, 575, 587

See application file for complete search history.

(56) References Cited

U.S. PATENT DOCUMENTS

| | | | | |
|---|---|---|---|---|
| 3,600,755 | A | * | 8/1971 | Cook .......................... 425/574 |
| 6,015,284 | A | * | 1/2000 | Eppich et al. ............... 425/587 |
| 6,354,829 | B1 | * | 3/2002 | Koide et al. ................. 425/557 |
| 6,783,353 | B2 | * | 8/2004 | Kasai et al. ................. 425/574 |
| 2002/0081351 | A1 | | 6/2002 | Yokoya et al. |
| 2003/0049351 | A1 | | 3/2003 | Kasai et al. |
| 2003/0108640 | A1 | | 6/2003 | Nishizawa et al. |

FOREIGN PATENT DOCUMENTS

| | | |
|---|---|---|
| JP | 2000-202877 | 7/2000 |
| JP | 2001-269974 | 10/2001 |
| JP | 2004-001279 | 1/2004 |

OTHER PUBLICATIONS

European Search Report in corresponding Application EP 05 25 2126.7-2307 dated Aug. 5, 2005.

* cited by examiner

*Primary Examiner*—Yogendra Gupta
*Assistant Examiner*—Maria Veronica D. Ewald
(74) *Attorney, Agent, or Firm*—Staas & Halsey LLP (57) ABSTRACT

An injection unit of an injection molding machine capable of preventing a displacement of an axis of a heating barrel and an axis of an injection screw and facilitating a nozzle axis adjustment. A front plate supporting a heating barrel is fixed to a base with a height-adjusting mechanism located in-between. A rear plate is connected to the front plate by connecting members symmetrically arranged. The injection screw inserted in the heating barrel is rotatably supported by a pusher plate to which a ball nut is fixed. A ball screw engaged with the ball nut is rotatably supported by the rear plate. The pusher plate is supported and guided by the support/guide member, and moves forward to inject resin by the rotation of the ball screw. The support/guide member is supported by a supporting member fixed to the front plate. Being independent of the connecting members that are deformed to be elongated at the time of the injection, the pusher plate remains uninfluenced, making it possible to prevent the displacement of the axes of the heating barrel and the injection screw.

6 Claims, 6 Drawing Sheets

INJECTION UNIT OF INJECTION MOLDING MACHINE

BACKGROUND OF THE INVENTION

1. Field of the Invention

The present invention relates to an injection unit of an injection molding machine.

2. Description of Related Art

An injection unit of an injection molding machine has a front plate that is fitted with a heating cylinder and is fixed to a base of the injection unit and a rear plate connected to the front plate at a distance from each other with a tie bar or the like. Disposed between the front plate and the rear plate is a pusher plate to which an injection screw is fitted to be rotatable and axially unmovable, and disposed between the pusher plate and the rear plate is a drive mechanism for moving the pusher plate backward and forward. The pusher plate is guided by the tie bar or the like to move backward and forward, and the injection screw is then moved forward to perform injection.

The pusher plate is supported and guided by the tie bar or the like to be displaced, and the weight of the pusher plate is applied to the tie bar or the like, which results in the flexure of the tie bar or the like. The flexure of the tie bar not only deteriorates the slidability of the pusher plate but also causes the displacement of the central axis of the pusher plate. Moreover, extra load is applied to the drive mechanism, such as a ball screw, for driving the pusher plate, and shortens the life duration of the mechanism. Under the circumstances, an injection unit in which a pusher plate is supported and guided by a linear guide fitted to the base of the injection unit has been well known (see JP 2001-269974A). JP 2001-269974A further teaches providing a pusher plate height-adjusting mechanism using a wedge-shaped member.

There is another well-known invention in which no tie bar is disposed between the front plate and the rear plate, but a sidewall for connecting the front plate and the rear plate is provided. A spline shaft portion of an injection screw is borne by a bearing that constitutes a body frame together with the front and rear plates. There is also disposed a linear guide in the bottom face of the body frame, and a shaft-connecting portion where the linear motion member of a linear motor and the spline shaft of the injection screw are connected to each other is guided by the linear guide (see JP 2004-1279A).

In an injection unit, injection pressure at the time of injection is transmitted through the injection screw to the pusher plate and then transmitted to the rear plate to which the drive mechanism for driving the pusher plate is fixed. The injection force transmitted to the rear plate is applied to connecting members, such as a sidewall and a tie bar having relatively low rigidity, which connect the front plate and the rear plate, and deforms the connecting member to absorb the injection pressure. The deformation of the connecting members causes the displacement of the central axis of the injection screw. If the connecting members that receive the injection force have a configuration symmetric with respect to the screw shaft, the connecting members are equally stretched in the axial direction of the screw shaft, so that the superposition of the linear guide upon the connecting members does not cause the displacement of the central axis of the screw.

If the front and rear plates are connected by a floor in addition to the sidewall, however, the floor also receives the injection force in an injecting process and acts in the same manner as the sidewall.

Figure 7:
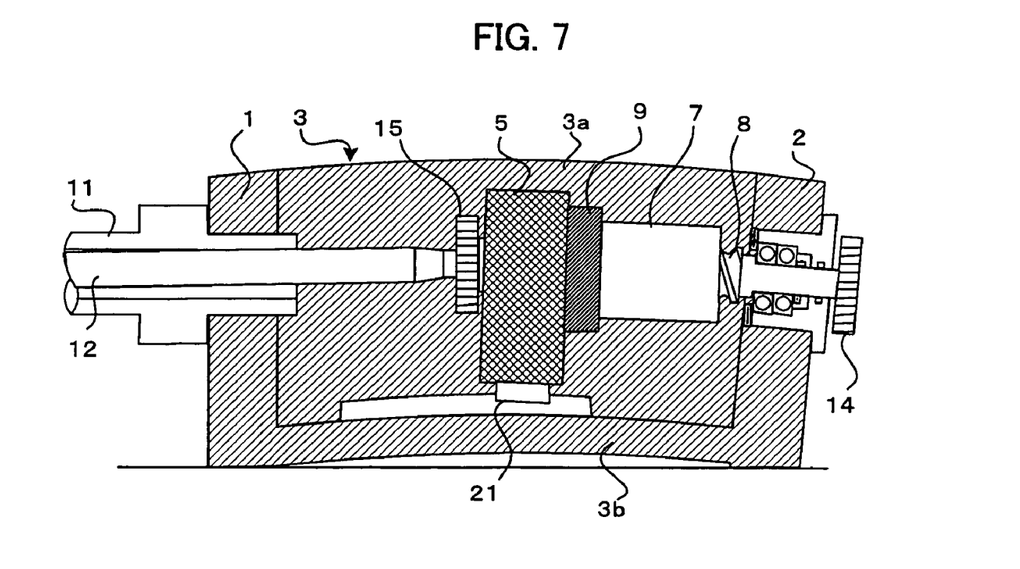
FIG. 7 is an explanatory view of a deformation caused by an injection force in a conventional injection unit.

FIG. 7 is a view for explaining deformation of connecting members and the like, attributable to an injection force at the time of injection. In FIG. 7, a front plate 1 and a rear plate 2 are connected to each other by sidewalls 3a and a base member 3b which constitute connecting members 3. A heating barrel 11 is fixed to the front plate 1, and an injection screw 12 is inserted in the heating barrel 11. The injection screw 12 is fitted to a pusher plate 5 to be rotatable and axially unmovable, and is driven to rotate by a motor for screw rotation or the like, not shown, through a pulley 15. A ball nut 7 is attached to the pusher plate 5 with a load cell 9 disposed therebetween. A ball screw 8 is screwed in the ball nut 7, and the ball screw 8 is supported by the rear plate 2 to be rotatable and axially unmovable. The ball screw 8 is driven to rotate by a motor for injection, not shown, through a pulley 14 provided to the end thereof, and causes the pusher plate 5 to move forward (from right to left in the drawing), to thereby perform injection.

Injection pressure (injection force) created by the injection is transmitted to the screw 12, the pusher plate 5, the ball nut 7, the ball screw 8, and the rear plate 2, and eventually deforms the connecting members 3 including the sidewalls 3a and the base member 3b which have relatively low rigidity. If arranged symmetrically with respect to a screw shaft, the connecting members 3 are equally stretched in the axial direction of the screw shaft. As illustrated in FIG. 7, however, there is a space in a plane (upper side of the injection unit) on the side that is axisymmetrical about the screw shaft to the base member 3b that functions in the same manner as the sidewall 3a, so that the rigidity thereof is lower than the other three planes, and the upper side of the injection unit is deformed to splay.

For that reason, as disclosed in JP 2001-269974A and JP 2004-1279A, if a supporting member for mounting the linear guide is fixed onto the floor, rectilinearity of axial displacement of a member corresponding to the pusher plate is maimed, and the displacement of the central axis of the screw occurs in relation to the heating barrel fixed to the front plate, which raises the fear that the inner face of the heating barrel and the screw are brought into contact with each other.

In case that the pusher plate is guided by the tie bar serving as a connecting member as described in JP 2001-269974A, there generates the problem that the tie bar itself is bent and deformed, and rectilinearity is lost, which deteriorates the slidability of the guide.

Typically in an injection molding machine, the exchange of a mold and a heating barrel is carried out by the end user. It is required in each case to align the mold with the axis height of a nozzle fitted to the end of the heating barrel. However, the adjustment of the axis height of the nozzle is a difficult work for the end user, and an unsuccessful work causes the displacement of the central axis of the screw in relation to the heating barrel.

SUMMARY OF THE INVENTION

The present invention provides an injection unit of an injection molding machine capable of preventing a displacement of an axis of an injection screw relative to an axis of a heating barrel, and easily performing an axis adjustment of a nozzle.

The injection unit of the present invention comprises: a front plate supporting a heating barrel; a rear plate; connecting members connecting the front plate and the rear plate; a pusher plate for pushing one end of the injection screw; a support/guide member supporting and guiding the pusher plate to be linearly movable; a mechanism arranged between the pusher plate and the rear plate, for linearly moving the pusher plate to push the injection screw; and a supporting member provided separately from the connecting members and fixed to only one of the front plate and the rear plate, for supporting the support/guide member. With the above arrangement, the displacement of the central axis of the heating barrel and the injection screw is prevented.

The injection unit may further comprise a base and a height-adjusting mechanism arranged between the base and the front plate for adjusting the height of the front plate, and the front plate may be fixed to the base through the height-adjusting mechanism.

The supporting member may be located on an inner side or an outer side of the connecting members.

The connecting members may comprise wall members or rod members.

The front plate, the rear plate and the connecting members may be formed integrally, and the supporting member and the one of the front plate and the rear plate may be formed integrally.

Since the pusher plate rotatably supporting the injection screw is provided independently of the connecting members connecting the front plate and the rear plate which are deformed by an injection force at the time of injection, the pusher plate is not influenced by the deformation of the connecting members. Further, the support/guide member for supporting and guiding the pusher plate is fixed to the front plate or the rear plate, so that it is possible to prevent displacement of the axis of the injection screw supported by the pusher plate and the heating barrel supported by the front plate. In addition, the height-adjusting mechanism for adjusting height of the front plate facilitates adjustment of the nozzle height.

DETAILED DESCRIPTION

Figure 1A:
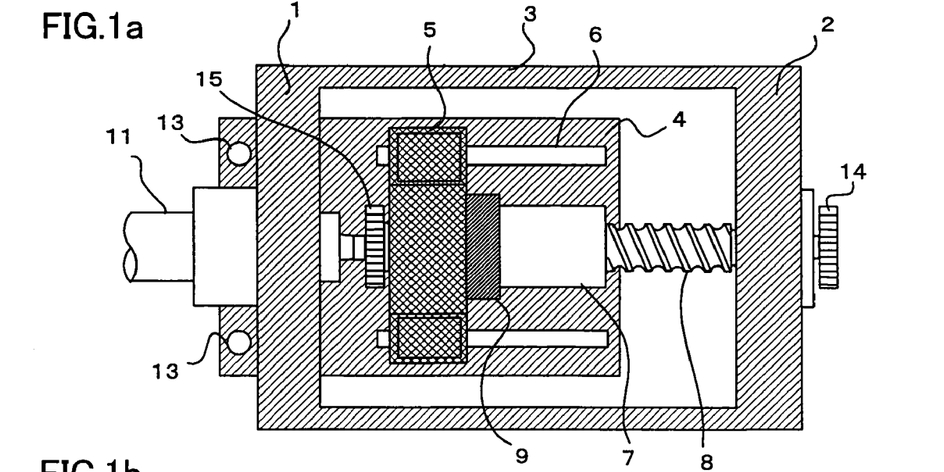
FIG. 1a is a plan view of the present invention according to a first embodiment.
Figure 1B:
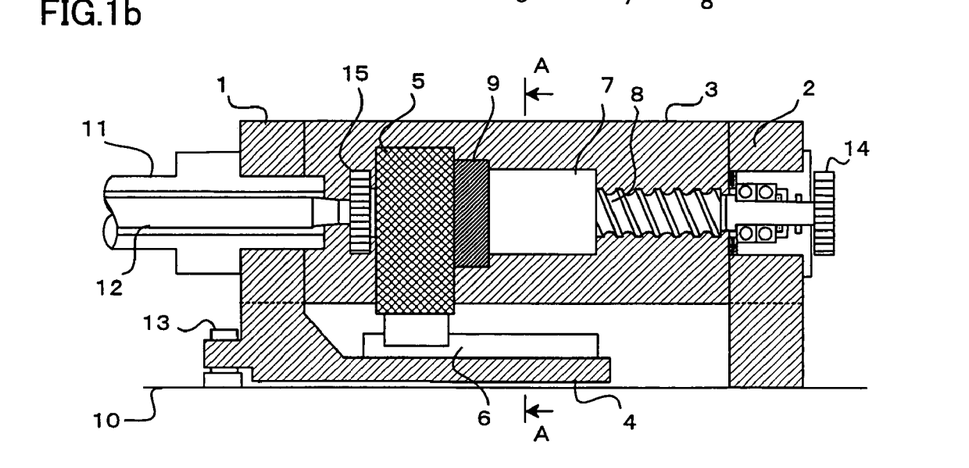
FIG. 1b is a side view of the present invention according to the first embodiment.
Figure 1C:
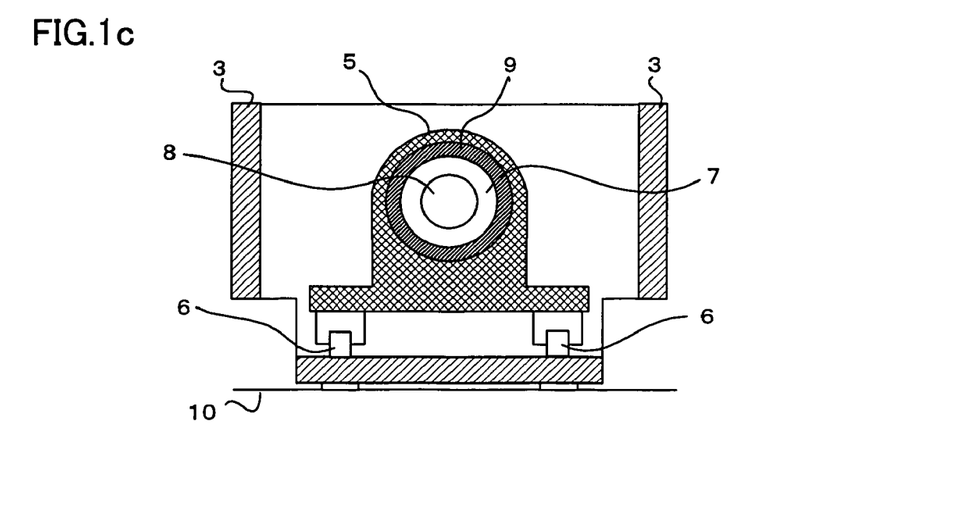
FIG. 1c is a sectional view of the present invention according to the first embodiment, taken along line A—A of FIG. 1b.

FIGS. 1a through 1c show an injection unit according to a first embodiment of the present invention. FIG. 1a is a plan view, FIG. 1b is a side view, and FIG. 1c is a sectional view, taken along line A—A of FIG. 1b.

A front plate 1 and a rear plate 2 are connected to each other by wall-like connecting members 3. A supporting member 4 for fixedly supporting support/guide members 6 which supports and guides a pusher plate 5 linearly movable is fixed to the front plate 1. Although the first embodiment is described as an example in which the front plate 1, the rear plate 2 and the supporting member 4 are integrally formed, they may be constructed as separate members and assembled into one body.

A heating barrel 11 is fitted to the front plate 1. The pusher plate 5 is disposed between the front plate 1 and the rear plate 2. The pusher plate 5 is supported and guided in respect of linear displacement thereof parallel with a displacing direction (injecting direction) of the supporting member 4 by using the guide/support members 6 arranged symmetrically with respect to an axis of an injection screw 12. The injection screw 12 is fitted to the pusher plate 5 to be rotatable and axially unmovable, and is driven to rotate by a motor for screw rotation or the like, not shown, through a pulley 15. The injection screw 12 is inserted in the heating barrel 11. A ball nut 7 is fitted to the pusher plate 5 with a load cell 9 disposed therebetween. A ball screw 8 is screwed in the ball nut 7, and is supported by the rear plate 2 to be rotatable and axially unmovable. The ball screw 8 is driven to rotate by a motor for injection, not shown, through a pulley 14 provided to an end thereof, and causes the pusher plate 5 to move forward (from right to left in the drawing), to thereby perform injection.

A pair of height-adjusting mechanisms 13 for adjusting the height of the front plate 1 is arranged in the front plate 1 symmetrically with respect to the axis of the injection screw 12, and the front plate 1 is fixed to a base 10 of the injection unit through the height-adjusting mechanisms 13. The supporting member 4 provided to the front plate 1 protrudes from the front plate 1 to the pusher plate 5 side. The rear plate 2 is placed on the base 10.

The motor for screw rotation, not shown, is driven to rotate the injection screw 12 through the pulley 15, to thereby melt resin that has been fed into the heating barrel 11. Due to melting pressure, the injection screw 12 is pushed and moved backward (from left to right in FIG. 1a), and the pusher plate 5 is supported and guided by the guide/support members 6 to move backward. At this moment, the ball nut 7 fitted to the pusher plate 5 moves backward while rotating the ball screw 8, but back pressure is provided by giving such a force as to prevent the rotation of the ball screw 8 through the pulley 14 by means of the motor for injection.

The resin is melted and kneaded in the above manner, and the injection screw 12 moves backward to a measuring position. Once a measuring process is finished, the driving of the motor for screw rotation is stopped. Subsequently, the motor for injection is driven to rotate the ball screw 8 through the pulley 14, and the pusher plate 5 is caused to move forward through the ball nut 7 in which the ball screw 8 is screwed, to thereby make the injection screw 12 move forward. Then, the melt resin is injected into a mold, not shown. Injection force (injection pressure) created during the injection is transmitted to the injection screw 12, the pusher plate 5, the ball nut 7, the ball screw 8, and the rear plate 2. The rear plate 2 pulls the connecting members 3 to elongate and deform the connecting members 3. Since the connecting members 3 are disposed symmetrically with respect to the axis of the injection screw 12 and the ball screw 8, and are then equally elongated and deformed. Consequently, there is scarcely any change in position of the rear plate 2 and the front plate 1. The supporting member 4 surmounted by the guide/support members 6 that guide the pusher plate 5 is fixed to the front plate 1 having rigidity, and is independent of the elongated and deformed connecting members 3 and free from influence thereof. Accordingly, the pusher plate 5 is guided by the guide/support members 6 and displaced parallel with the axis of the injection screw 12 and that of the ball screw 8. As a result, there hardly generates displacement of a central axis of the heating barrel 11 fitted to the front plate 1 from that of the injection screw 12 and the ball screw 8.

In the first embodiment, the height-adjusting mechanisms 13 for adjusting the height of the front plate 1 are provided. At the time of the exchange of the mold and the heating barrel 11, it is required to align the mold with the axis height of the nozzle fitted to the end of the heating barrel 11. In this case, the axis of the injection screw 12 can be easily brought in line with the heating barrel 11 by adjusting the height of the front plate 1 using the height-adjusting mechanisms 13.

The height-adjusting mechanism 13, although various kinds of adjusting mechanisms may be utilized, is for example made up of a member fixed to the base 10 of the injection unit, a jack bolt that is interfitted in a recessed portion formed in the above member so that an end thereof is brought into contact therewith and is screwed in a threaded portion of a flange portion of the front plate 1, and the like, to thereby rotate the jack bolt to adjust the height thereof and adjust the height of the front plate 1. In addition, the front plate 1 is fixed to the base 10 by the height-adjusting mechanisms 13.

Figure 2A:
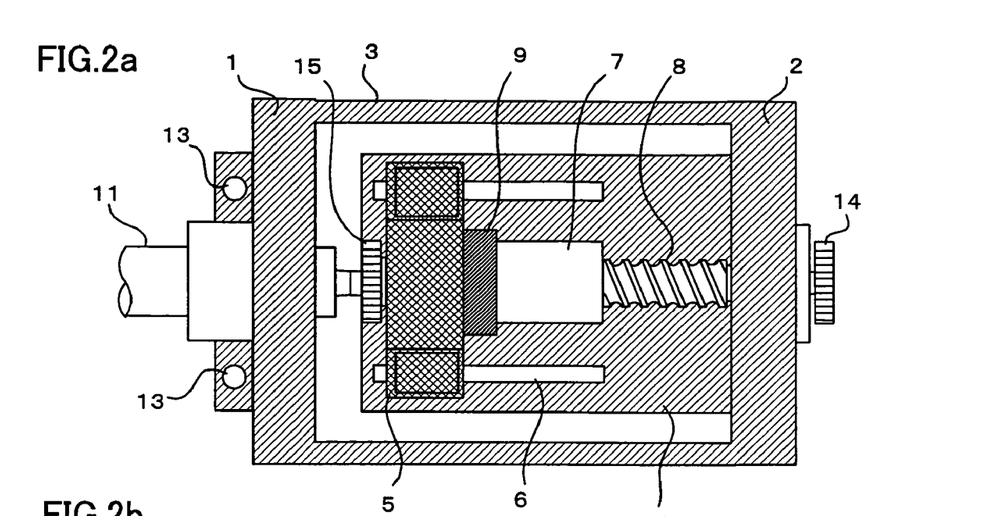
FIG. 2a is a plan view of the present invention according to a second embodiment.
Figure 2B:
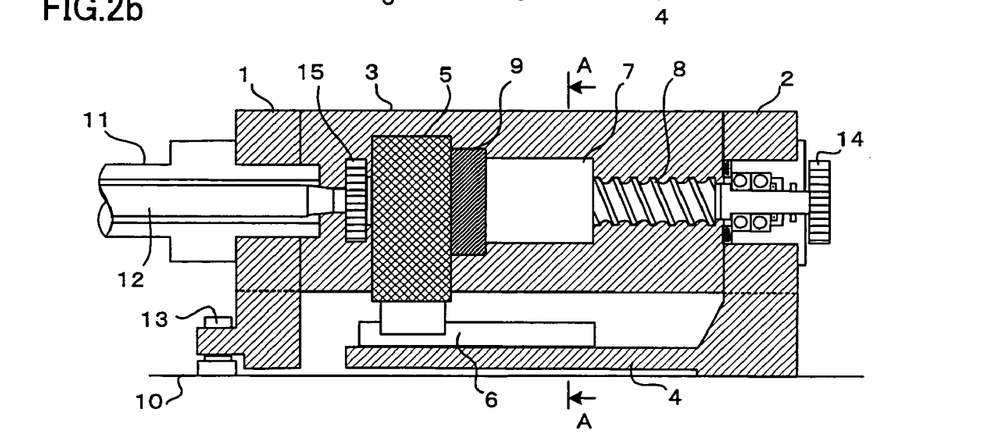
FIG. 2b is a side view of the present invention according to the second embodiment.
Figure 2C:
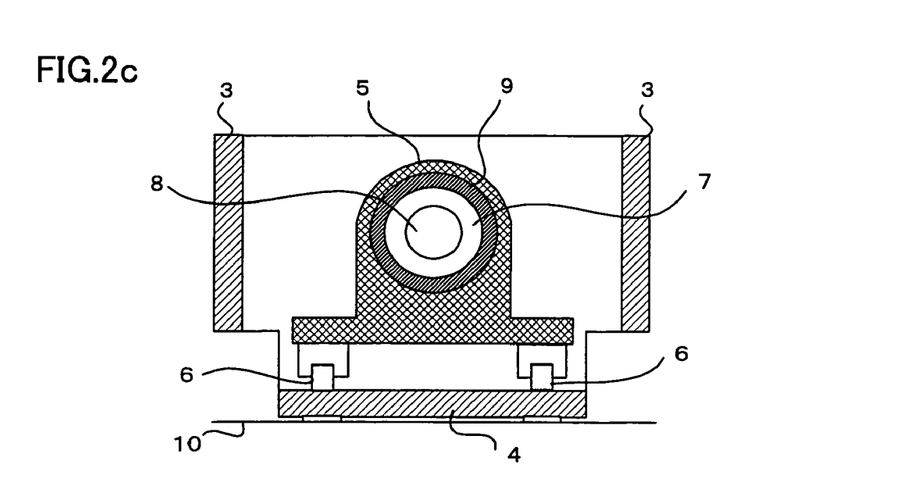
FIG. 2c is a sectional view of the present invention according to the second embodiment, taken along line A—A of FIG. 2b.

FIGS. 2a through 2c are explanatory views of a second embodiment of the present invention. FIG. 2a is a plan view, FIG. 2b is a side view, and FIG. 2c is a sectional view, taken along line A—A of FIG. 2b.

The difference between the second embodiment and the first is that the supporting member 4 for fixing guide portions of the guide/support members 6 of the pusher plate 5 is provided to the rear plate 2 side, but otherwise the second embodiment is identical to the first. Again, in the second embodiment, the front plate 1, the rear plate 2 and the supporting member 4 are integrally constructed, but may be constructed as separate members and assembled into one body. The supporting member 4, as illustrated in FIG. 2b, is fitted to the rear plate 2 so as to leave a narrow space with respect to the base 10 of the injection unit, but may be constructed on the same level as a bottom face shared with the rear plate 2 to be superposed upon the base 10.

In the second embodiment, the injection force is applied to the rear plate 2 at the time of injection as in the first embodiment, thereby elongating and deforming the wall-like connecting members 3. However, since the pusher plate 5 is guided by the guide/support members 6 fixed to the supporting member 4 that is independent of and does not interfere the connecting members 3, the pusher plate 5 is not influenced by the elongation and deformation of the connecting members 3. Moreover, the supporting member 4 having the guide portions of the guide/support members 6 by which the pusher plate 5 is supported is fixed to the rear plate 2, thus maintaining rectilinearity of the pusher plate 5 and preventing the displacement of the central axis of the heating barrel 11 from that of the injection screw 12 and the ball screw 8.

Figure 3A:
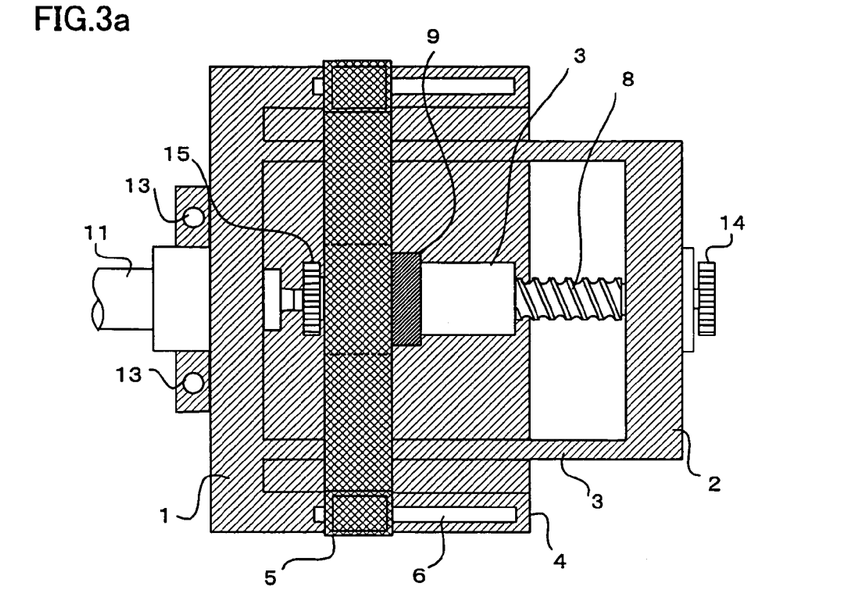
FIG. 3a is a plan view of the present invention according to a third embodiment.
Figure 3B:
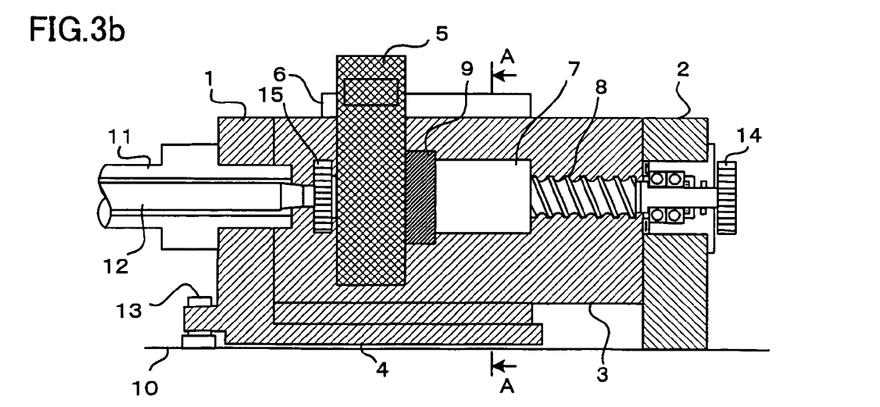
FIG. 3b is a side view of the present invention according to the third embodiment.
Figure 3C:
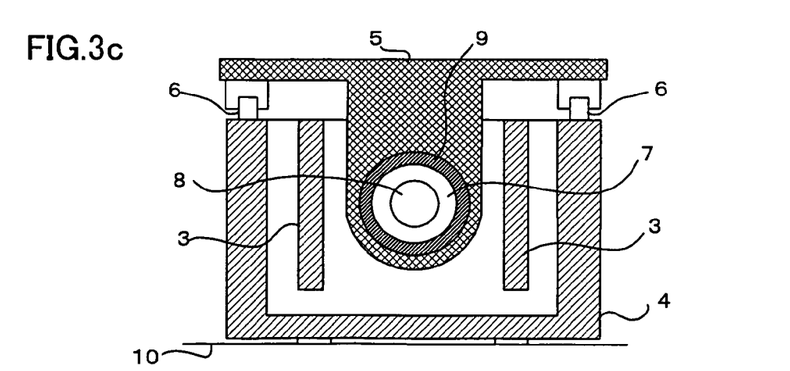
FIG. 3c is a sectional view of the present invention according to the third embodiment, taken along line A—A of FIG. 3b.

FIGS. 3a through 3c are explanatory views of a third embodiment of the present invention. FIG. 3a is a plan view, FIG. 3b is a side view, and FIG. 3c is a sectional view, taken along line A—A of FIG. 3b.

The third embodiment is different from the first in that the front plate 1, the pusher plate 5 and the supporting member 4 are formed greater in width, but is otherwise identical to the first embodiment. To be concrete, as illustrated in FIGS. 3a and 3c, the width (direction perpendicular to the injecting direction) of the front plate 1 is increased to be wider than the rear plate 2, and the supporting member 4 is also formed to have the same width. The guide portions of the guide/support members 6 are located on the outside of the wall-like connecting members 3 that connect the front plate 1 and the rear plate 2. The pusher plate 5 is provided with protruding portions that protrude in a width direction to be formed like flanges and extend outside the connecting members 3, and the guide/support members 6 are arranged underneath respective ends of the protruding portions and supported by the supporting member 4. Other constructions are the same as the first embodiment.

Comparing the third embodiment to the first, the first embodiment can be compactly constructed since the supporting member 4 is located on the inside of the connecting members 3 that connect the front plate 1 and the rear plate 2. Furthermore, since the pusher plate 5 can be compactly constructed, it is possible to reduce the inertia of the pusher plate 5. In contrast, it is difficult to form the third embodiment into small size, compared to the first embodiment, since the supporting member 4 protrudes outside the connecting members 3. Moreover, there is a disadvantage that the inertia of the pusher plate 5 is greatened. On the other hand, the distance between the guide/support members 6 that support the pusher plate 5 is longer than in the first embodiment, which greatens such a force as to prevent the pusher plate 5 from inclining in the width direction (vertical direction in FIG. 3a). This makes it possible to surely prevent width-directional displacement of the axis of the injection screw 12 and the ball screw 8 in relation to the axis of the heating barrel 11. Although the third embodiment is described as an example in which the front plate 1, the rear plate 2 and the supporting member 4 are integrally constructed, they may be constructed as separate members and assembled into one body.

Figure 4A:
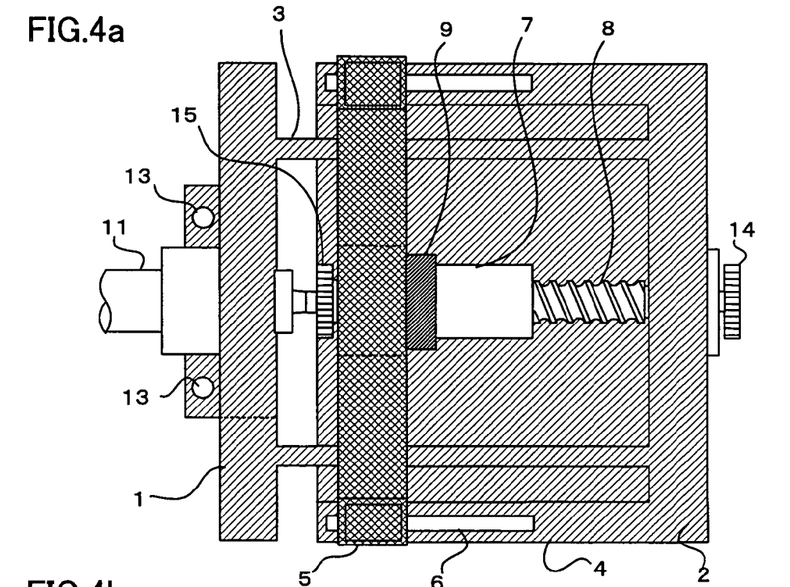
FIG. 4a is a plan view of the present invention according to a fourth embodiment.
Figure 4B:
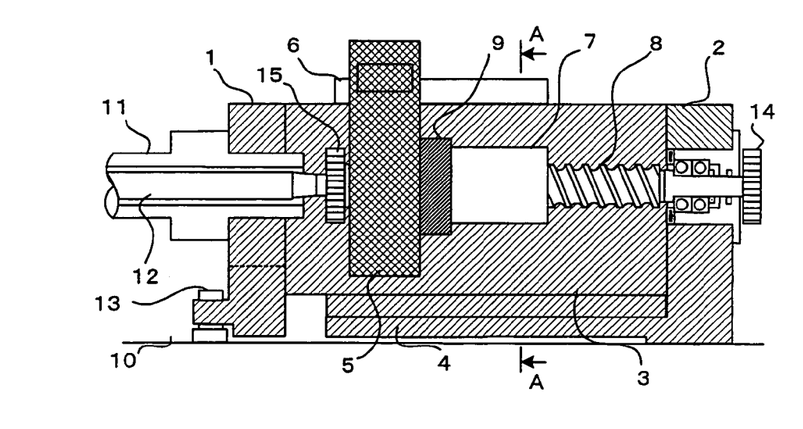
FIG. 4b is a side view of the present invention according to the fourth embodiment.
Figure 4C:
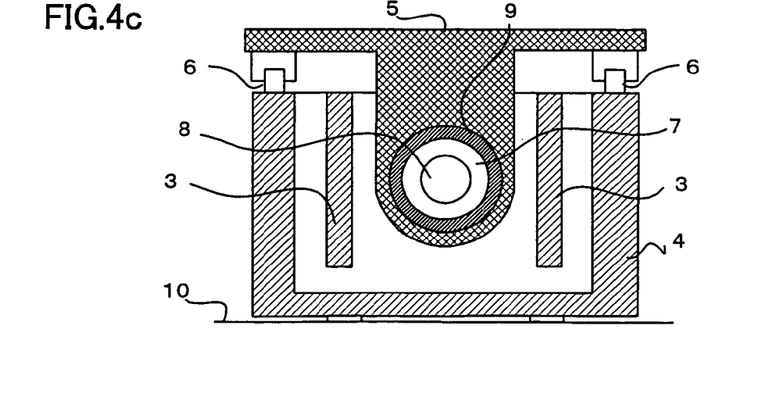
FIG. 4c is a sectional view of the present invention according to the fourth embodiment, taken along line A—A of FIG. 4b.

FIGS. 4a through 4c are explanatory views of a fourth embodiment of the present invention. FIG. 4a is a plan view, FIG. 4b is a side view, and FIG. 4c is a sectional view, taken along line A—A of FIG. 4b.

In the fourth embodiment, as in the third, the widths of the supporting member 4 and others are greatened. Only difference from the third embodiment is that the supporting member 4 is fitted to the rear plate 2 side, and otherwise the fourth embodiment is identical to the third. As compared to the second embodiment, the difference from the second embodiment is that the widths of the supporting member 4 and others are greatened to protrude outside the connecting members 3, and the pusher plate 5 is supported by the guide/support members 6 in outside positions of the connecting members 3, but otherwise the fourth embodiment is identical to the second. The fourth embodiment is similar to the third in terms of operation and advantages, and is also similar to the second in terms of operation and advantages obtained by disposing the supporting member 4 on the rear plate 2 side. The fourth embodiment is described as an example in which the front plate 1, the rear plate 2 and the supporting member 4 are integrally formed, but they may be constructed as separate members and assembled into one body.

Figure 5A:
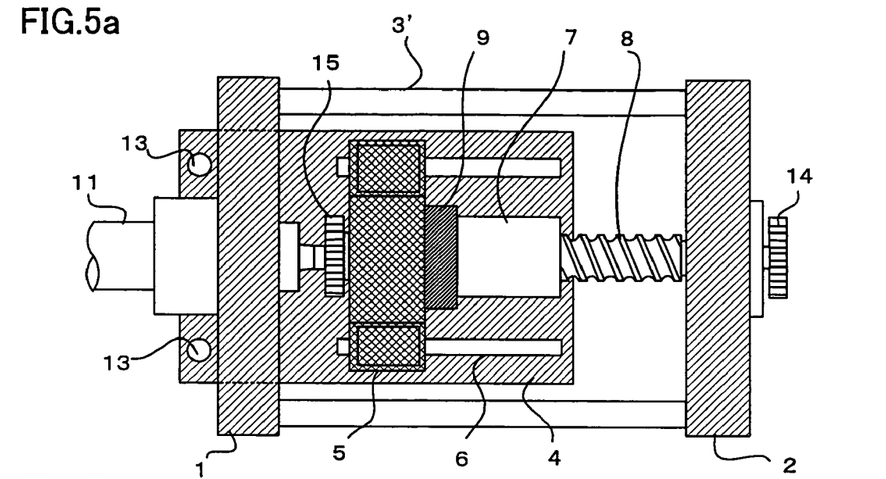
FIG. 5a is a plan view of the present invention according to a fifth embodiment.
Figure 5B:
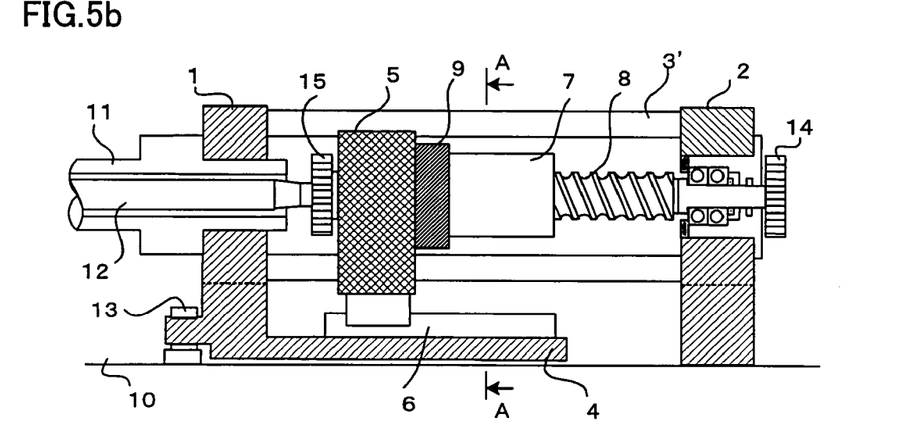
FIG. 5b is a side view of the present invention according to the fifth embodiment.
Figure 5C:
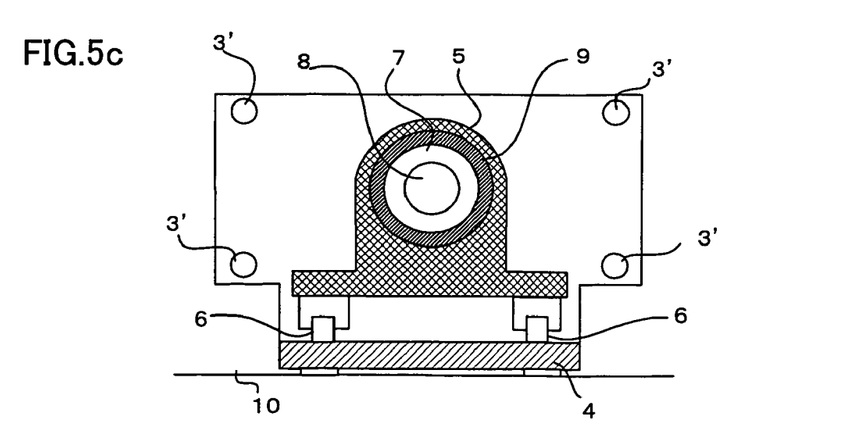
FIG. 5c is a sectional view of the present invention according to the fifth embodiment, taken along line A—A of FIG. 5b.

FIGS. 5a through 5c are explanatory views of a fifth embodiment of the present invention. FIG. 5a is a plan view, FIG. 5b is a side view, and FIG. 5c is a sectional view, taken along line A—A of FIG. 5b.

The fifth embodiment is an example in which the connecting members for connecting the front plate 1 and the rear plate 2 are formed into rod-like objects 3', but is otherwise identical to the first embodiment. Concretely, in the fifth embodiment, the front plate 1 and the rear plate 2 are connected to each other by four rod-like connecting members 3'. The pusher plate 5 is supported and guided by the supporting member 4 provided to the front plate 1 through the guide/support members 6, and is located to be unrelated to and independently of the rod-like connecting members 3'. The workings, operation, and advantages of the above injection unit are the same as those of the first embodiment.

Figure 6:
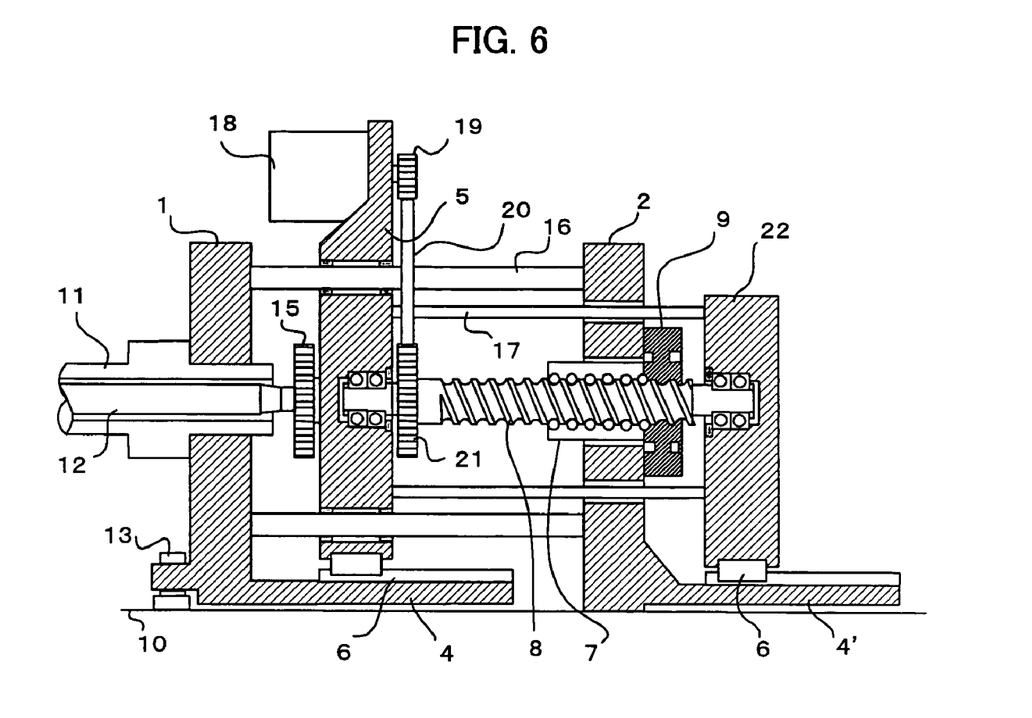
FIG. 6 is a side view of the present invention according to a sixth embodiment.

FIG. 6 shows a sixth embodiment of the present invention. This embodiment includes a support plate 22 for supporting the pusher plate 5, and the pusher plate 5 is supported by the guide/support members 6 and guided by guide rods 16 disposed between the front plate 1 and the rear plate 2.

The front plate 1 is fixed to the base 10 of the injection unit with the height-adjusting mechanism 13 disposed therebetween. The front plate 1 is fitted with the supporting member 4 that protrudes toward the pusher plate 5 side. The heating barrel 11, into which the injection screw 12 is inserted, is attached to the front plate 1. The injection screw 12 is fitted to the pusher plate 5 to be rotatable and axially unmovable. A pulley is secured to the injection screw 12, and the injection screw 12 is driven to rotate by the motor for screw rotation, not shown, through the pulley 15. The front plate 1 and the rear plate 2 are connected to each other by the plurality of (four) guide rods 16. The guide rods 16 pierce through holes formed in the pusher plate 5, and the displacement of the pusher plate 5 is guided by the guide rods 16. At the same time, the pusher plate 5 is supported and guided in respect of linear displacement thereof by the supporting member 4 through the guide/support members 6.

One end of the ball screw 8 is attached to the pusher plate 5 to be rotatable and axially unmovable. Fitted to the ball screw 8 is a driven pulley 21. A timing belt 20 is hung between a driving pulley 19 disposed in an output axis of a motor for injection 18 fixed to the pusher plate 5 and the driven pulley 21. The driving of the motor for injection 18 activates the ball screw 8 to rotate. The ball nut 7 in which the ball screw 8 is screwed is fitted to the rear plate 2 through the load cell 9 to be unrotatable and axially unmovable. The other end of the ball screw 8 is attached to the support plate 22 to be rotatable and axially unmovable.

A supporting member 4' is disposed in the rear plate 2 to protrude rearward (opposite side of the front plate), and the support plate 22 is supported by the guide/support members 6 through the guide portions of the guide/support members 6 provided to the supporting member 4'. A plurality of connecting rods 17 pierce through holes formed in the rear plate 2 and connect the pusher plate 5 and the supporting plate 22.

In a measuring-kneading process, the injection screw 12 is driven to rotate by the motor for screw rotation, not shown, through the pulley 15, thus melting resin. In an injecting process, the motor for injection 18 is driven to rotate the ball screw 8 through the driving pulley 19, the timing belt 20 and the driven pulley 21. Since the ball nut 7 in which the ball screw 8 is screwed is fixed to the rear plate 2, the ball screw 8 is displaced in the axial direction while rotating, and causes the pusher plate 5 to move forward (from right to left in FIG. 6), to thereby perform injection. At this moment, the pusher plate 5 is supported and guided by the guide/support members 6, and is simultaneously guided by the guide rods 16. Furthermore, the pusher plate 5 is controlled by the support plate 22 in terms of a displacing direction thereof, thereby making linear displacement.

In the sixth embodiment, the pusher plate 5 is engaged with the guide rods 16 that connect the front plate 1 and the rear plate 2. However, since the pusher plate 5 is supported and guided by the guide/support members 6, and is supported also by the support plate 22 that is supported by the supporting member 4 provided to the rear plate 2 using the guide/support members 6 through the connecting rods 17, the axis of the ball screw 8 is securely retained, which makes it possible to prevent the displacement of the central axis of the heating barrel 11 and the injection screw 12.

What is claimed is:

1. An injection unit of an injection molding machine for moving an injection screw axially in a heating barrel, said injection unit comprising:
    a front plate supporting the heating barrel;
    a rear plate;
    connecting members connecting said front plate and said rear plate;
    a pusher plate for pushing one end of said injection screw;
    a support/guide member supporting and guiding said pusher plate to be linearly movable;
    a mechanism arranged between said pusher plate and said rear plate, for linearly moving said pusher plate to push the injection screw; and
    a supporting member provided separately from said connecting members and fixed to said front plate, for supporting said support/guide member,
    wherein said front plate, said rear plate and said connecting members are formed integrally, and said supporting member and said front plate are formed integrally.

2. An injection unit according to claim 1, further comprising a base and a height-adjusting mechanism arranged between said base and said front plate for adjusting the height of said front plate, said front plate being fixed to said base through said height-adjusting mechanism.

3. An injection unit for an injection molding machine according to claim 1, wherein said supporting member is located on an inner side of said connecting members.

4. An injection unit for an injection molding machine according to claim 1, wherein said supporting member is located on an outer side of said connecting members.

5. An injection unit for an injection molding machine according to claim 1, wherein said connecting members comprise wall members.

6. An injection unit for an injection molding machine according to claim 1, wherein said connecting members comprise rod members.

* * * * *